United States Patent [19]

Betlinski

[11] 4,185,516
[45] Jan. 29, 1980

[54] OVERLOAD SAFETY FASTENER

[75] Inventor: Glenn M. Betlinski, Cedar Rapids, Iowa

[73] Assignee: FMC Corporation, San Jose, Calif.

[21] Appl. No.: 865,471

[22] Filed: Dec. 29, 1977

[51] Int. Cl.² .............................................. F16C 1/10
[52] U.S. Cl. ............................ 74/501.5 R; 74/501 R; 248/27.3
[58] Field of Search ................... 248/17, 18, 56, 27.3; 74/501.5 R, 503, 502, 501, 504, 511, 506; 64/2 R, 2 P; 151/36, 49, 51; 267/160, 162, 164; 49/230

[56] References Cited

U.S. PATENT DOCUMENTS

| | | | |
|---|---|---|---|
| 3,039,420 | 6/1962 | Bevis | 74/517 |
| 3,205,727 | 9/1965 | Sevrence | 74/501 R |
| 3,221,572 | 12/1965 | Swick | 74/501 |
| 3,366,405 | 1/1968 | Sevrence | 287/20 |
| 3,429,197 | 2/1969 | Loewenstern | 74/502 |
| 3,438,280 | 4/1969 | McCabe | 74/501 |
| 3,546,962 | 12/1970 | Ruhala | 74/501 |
| 3,758,053 | 9/1973 | Amelio | 244/83 R |
| 3,808,908 | 5/1974 | Guerr | 74/489 |
| 3,890,084 | 6/1975 | Clontz | 74/501 |
| 3,939,031 | 12/1975 | Webb | 74/501 |
| 3,960,032 | 1/1976 | Schiff | 74/501 |
| 4,041,797 | 8/1977 | Mito | 74/502 |

FOREIGN PATENT DOCUMENTS 1141719  1/1969  United Kingdom ..................... 267/162

Primary Examiner—Samuel Scott
Assistant Examiner—Jerry Anderson
Attorney, Agent, or Firm—J. W. Edwards; J. F. Verhoeven

[57] ABSTRACT

A motion transmitting control has an outer flexible conduit and an inner operating member reciprocable within the conduit. Attached to one end of the conduit is an end fitting having an externally threaded portion that fits through an aperture in a mounting plate. An overload safety fastener, that secures the end fitting within the mounting plate aperture, has a pair of stops threadedly mounted for axial movement upon the externally threaded portion of the end fitting to provide support for the end fitting on opposite sides of the mounting plate. Resilient means, positioned about the end fitting, extend axially thereof between one of the stops and the mounting plate. The resilient means are pre-loaded in compressive stress by the relative spacing between the stop and the mounting plate. Thus, the resilient means yieldably support the end fitting relative to the mounting plate. In a preferred form of the invention, the stops and the resilient means are reversible to provide support on either side of the mounting plate, and thereby compensate for either tension or compression stresses in the outer flexible conduit and the inner operating member.

4 Claims, 4 Drawing Figures

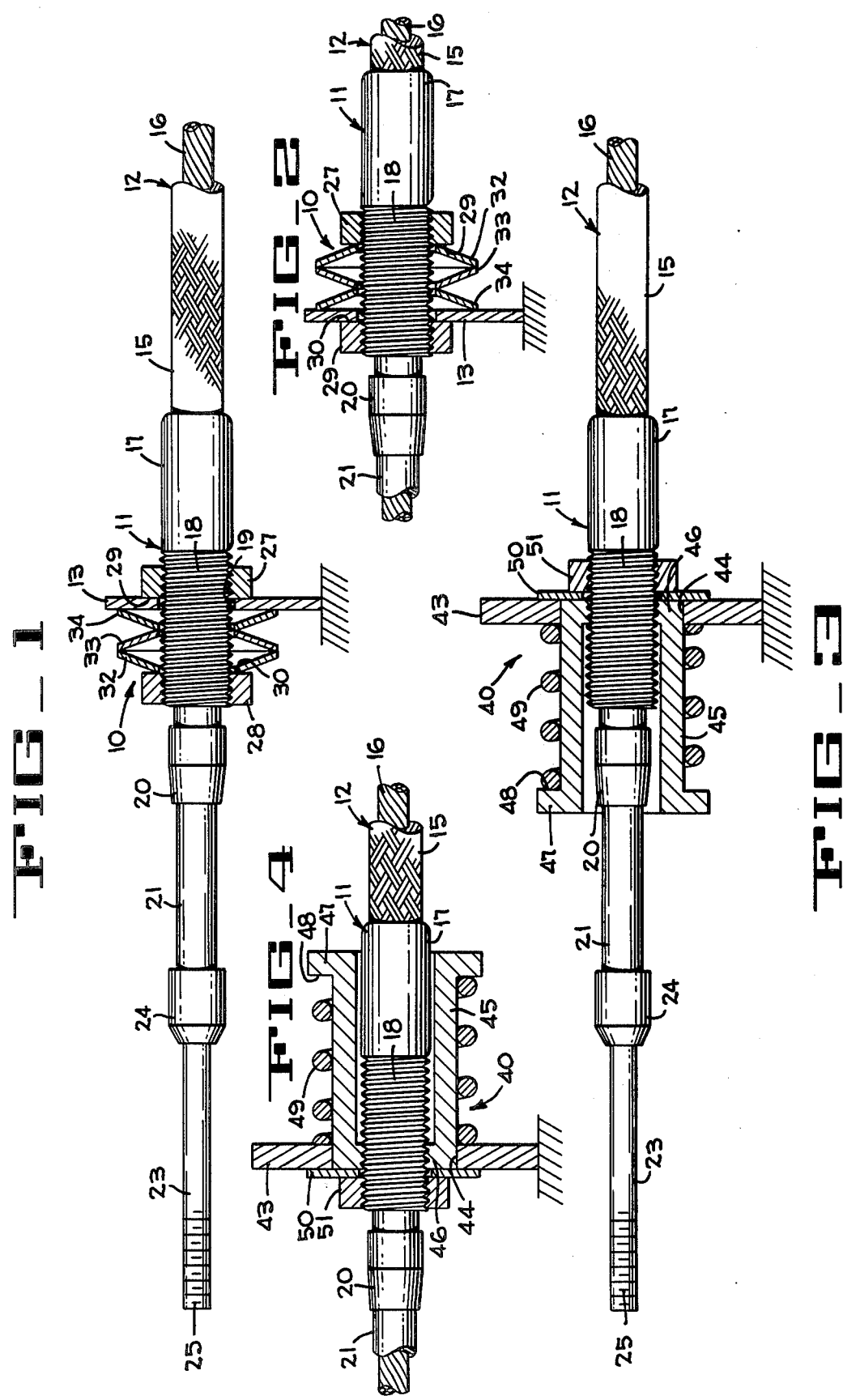

OVERLOAD SAFETY FASTENER

BACKGROUND OF THE INVENTION

1. Field of the Invention

This invention relates to machine elements and mechanisms as used in control lever and linkage systems that are usually hand operated and that include a flexible transmitter. More specifically, the invention pertains to an overload safety fastener for yieldably mounting, within an aperture of a mounting plate, an end fitting that is attached to an outer flexible conduit of a motion transmitting control having an inner operating member reciprocable therein for transmitting motion.

2. Description of the Prior Art

Bowden transmission mechanisms are used for the remote control of parts. Such motion transmitting controls have an outer flexible conduit and an inner operating member reciprocable within the conduit for transmitting linear force or motion between two points. Such controls often follow a tortuous path. At bends in the conduit or where the inner operating member deflects within the conduit or where there is friction between the inner operating member and the conduit, loading is transferred from the inner operating member to the conduit. Loading of the inner operating member produces a load of equal magnitude but opposite sense (tension or compression) in the conduit. Loading to failure of the mechanism will usually result in the failure of the inner operating member. However, the conduit could also be damaged.

When designing push-pull control cables to transfer linear force and motion between two points, the cable sizes are often selected on the basis of the force that can be applied to the cable, rather than the force that needs to be applied to the cable for operation of the control. This results in using a larger cable than required to meet the system needs. Larger cables usually result in greater cost, larger bend radii, greater space requirements, more static friction, and more backlash than smaller cables.

By using adjustable stops on the input mechanism of the cable, the load applied to the cable can be limited to some extent. Stops alone are not sufficient in systems where the device on the output end has stops that must be reached, where the output device has a variable total travel, where high loads are applied through what is normally the output device, or where there are high inertia or viscous effects.

The use of a spring between a push-pull cable conduit end and a member fixed relative to the conduit end to yieldably provide overload protection for the conduit is shown in U.S. Pat. No. 2,321,780 that issued to Tondeur on June 15, 1943; U.S. Pat. No. 3,383,940 that issued to Brilando et al on May 21, 1968; and U.S. Pat. No. 3,407,684 that issued to Van Noord on Oct. 29, 1968. These patents do not suggest pre-loading the spring and isolating the preloaded spring stress from the conduit.

A pre-compressed coil spring provides an automatic take-up for lengthening and/or shortening a control conduit, as shown in U.S. Pat. No. 2,380,015 that issued to Batterson et al on July 10, 1945. A separate manually adjustable take-up is also provided within the control conduit.

SUMMARY OF THE INVENTION

Advantages of the present invention include providing yieldable support with a mounting plate in the event of overloads for a control cable conduit end fitting, providing a manual slack take-up for the conduit end fitting, providing a single fastener that can be installed to compensate for overloads in either tension or compression stresses, providing a fastener that can be adjusted to vary the pre-load stress, and providing a fastener that has a predetermined pre-load stress.

An overload safety fastener secures an end fitting of a motion transmitting control within an aperture of a mounting plate. The end fitting has an externally threaded portion that fits through the aperture. A pair of stops project from the end fitting and each has radial flange faces extending substantially parallel to the mounting plate. At least one of the stops is threadedly mounted for axial movement upon the externally threaded portion of the end fitting. Resilient means are positioned about the end fitting and extend between the radial flange face of one of said stops and the mounting plate. The resilient means are pre-loaded in compressive stress to yieldably support the end fitting relative to the mounting plate, when the force on the outer flexible conduit and the end fitting exceeds the amount of pre-load.

BRIEF DESCRIPTION OF THE DRAWING

FIG. 1 is a longitudinal section of an overload safety fastener embodying the present invention. The fastener is mounted for yielding to an overload tension stress in an outer flexible conduit or to an overload compression stress in the inner operating member of a motion transmitting control.

FIG. 2 is a longitudinal section of the type of fastener shown in FIG. 1, but with the fastener mounted for yielding to an overload compression stress in the outer flexible conduit or to an overload tension stress in the inner operating member.

FIG. 3 is a longitudinal section of a modified form of overload safety fastener that has a predetermined pre-load stress. The fastener is mounted for yielding to an overload tension stress in the outer flexible conduit or an overload compression stress in the inner operating member.

FIG. 4 is a longitudinal section of the type of fastener shown in FIG. 3, but with the fastener mounted for yielding to an overload compression stress in the outer flexible conduit or an overload tension stress in the inner operating member.

DESCRIPTION OF THE PREFERRED EMBODIMENT

With reference to FIG. 1, an overload safety fastener 10 secures an end fitting 11 of a motion transmitting control 12 to a mounting plate 13. The motion transmitting control is a Bowden transmission mechanism or push-pull cable that has an outer flexible conduit 15 and an inner operating member 16 that is reciprocable within the conduit. The end fitting has a ferrule 17 that is attached to one end of the conduit. Extending from the ferrule is an externally threaded portion 18 of the end fitting that passes through aperture 19 in the mounting plate. The end fitting is connected through a swivel section 20 to a tube 21. An operating rod 23 fits telescopically through an end piece 24 of the tube, and the operating rod is connected to the inner operating member 16 within the tube. The operating rod has a threaded end portion 25 for attachment to either an operating handle or a movable part, neither of which are shown.

The overload safety fastener 10 has a pair of stops 27, 28 in the form of nuts that are threadedly mounted for longitudinal movement upon the externally threaded portion 18 of the end fitting 11 to provide support for the end fitting on opposite sides of the mounting plate 13. The stop 27 has a radial flange face 29, and the stop 28 has a radial flange face 30. Both faces extend substantially parallel to the mounting plate. The internally threaded bore of each stop has a diameter that is sufficient to enable the stop to slip over the swivel section 20 and the end piece 24. Positioned about the end fitting and extending axially between the radial flange face 30 and the mounting plate 13 are a series of spring washers 32, 33, 34. By turning the stop 28 for movement towards the mounting plate 13, the spring washers are compressed therebetween. The stop 27 supports the end fitting with its radial flange face 29 bearing against the opposite side of the mounting plate to isolate, from the conduit 15 the force exerted upon the end fitting by the spring washers.

When a desired pre-load compression force is set in the series of spring washers 32, 33, 34, the end fitting 11 will be held firmly in place within the aperture 19 of the mounting plate 13, until tension stress in the outer flexible conduit 15 exceeds the pre-load compression. Then the series of spring washers will be compressed further, allowing the end fitting to move in the direction towards the outer flexible conduit. Such movement of the end fitting occurs until the spring force and the operating force on the conduit are in equilibrium, or until the spring washers collapse, or until the operating force is restrained. Thus, the yieldable support of the end fitting provides safety against overload stresses on the conduit and in the inner operating member.

The stops 27 and 28 are preferably both threadedly mounted on the end fitting 11. This enables the end fitting to be moved relatively to the stops and the mounting plate, to either take up slack in the outer conduit or to provide slack as required.

The outer flexible conduit 15 follows a tortuous path to a similar end fitting at its opposite end, not shown. At bends in the conduit or where the inner operating member 16 deflects within the conduit or where there is friction between the inner operating member and the conduit, loading is transferred from the inner operating member to the conduit. Such loading stresses portions of the conduit in either tension or compression, depending upon the conduit curves and the type of loading on the inner operating member. For that reason, it is desirable that the end fitting 11 be adapted to provide yieldable support for either tension or compression stress.

Looking now at FIG. 2, the overload safety fastener 10 is shown mounting the end fitting 11 to provide yieldable support relative to the mounting plate 13 in response to overload compression stresses in the outer flexible conduit 15. The only difference between this mounting and the mounting shown in FIG. 1 is that the series of spring washers 32, 33, 34 are reversed and placed on the opposite side of the mounting plate, between the plate and the radial end face 29 of the stop 27. When compression stresses in the outer flexible conduit exceed the pre-load compression set in the series of spring washers, the washers will deflect and allow the end fitting to move in the direction towards the tube 21. Thus, the conduit is allowed to move in the same direction as the tube, thereby relieving the overload compression stress in the conduit and the tension stress in the inner operating member.

An overload safety fastener 40, shown in FIGS. 3 and 4, represents a modified form of the invention shown in FIGS. 1 and 2. Since the motion transmitting control 12, including the end fitting 11, is identical to that previously described with reference to FIGS. 1 and 2, like parts will be given the same reference numerals, and it will be understood that such parts are the same. A mounting plate 43 has an aperture 44 therein, for receiving the externally threaded portion 18 of the end fitting 11 and an extended cylindrical stop 45 that fits telescopically through the aperture. At one end of this extended cylindrical stop is an end portion 46 that is threadedly fitted upon the externally threaded portion of the end fitting. The cylindrical stop extends from the end portion, longitudinally of the end fitting, to a radial flange 47. This radial flange has a face 48 that extends substantially parallel to the mounting plate. A coil spring 49 is positioned about both the cylindrical stop and the end fitting. This spring extends between the radial flange face and the mounting plate. On the opposite side of the mounting plate from the spring, a washer 50 and a nut 51 form another stop that is threadably mounted for axial movement upon the externally threaded portion of the end fitting. The nut and the washer can be either welded together or separate.

Since the extended cylindrical stop 45 has a fixed length, the pre-load compression in the coil spring 49 is a constant predetermined amount. When tension stress in the outer flexible conduit 15 exceeds that amount, the coil spring will compress further, allowing the cylindrical stop to slip telescopically in the aperture 44 and the end fitting 11 to move in the direction towards the outer flexible conduit. Thus, the yieldable support of the end fitting provides safety against overload stresses on the conduit and the inner operating member.

With reference to FIG. 4, the overload safety fastener 40 mounts the end fitting 11 to the mounting plate 43 in a manner to provide yieldable support in response to an overload compression stress in the outer flexible conduit 15. The only difference between this mounting and that shown in FIG. 3 is that the extended cylindrical stop 45, coil spring 49, washer 50, and nut 51 have been reversed and placed on opposite sides of the mounting plate. When compression stresses in the outer flexible conduit exceed the pre-load compression set in the coil spring, the spring will deflect, allowing the end fitting to move in the direction towards the tube 21. Thus, the conduit moves in the same direction, thereby relieving the overload compression stress in the conduit and overload tension stress in the inner operating member.

From the foregoing description it will be seen that the overload safety fasteners 10 and 40 provide yieldable support with a mounting plate in the event of overloads for a control cable conduit end fitting. They also provide a manual slack take-up for the conduit at the end fitting. A single fastener can be installed to compensate for overloads in either tension or compression stresses. The fastener 10 can be adjusted to vary the pre-load stress, while the fastener 40 has a predetermined pre-load stress.

Although the best mode contemplated for carrying out the present invention has been herein shown and described, it will be apparent that modification and variation may be made without departing from what is regarded to be the subject matter of the invention.

What is claimed is:

1. In a motion transmitting control having an outer flexible conduit bent between opposite ends, an inner operating member reciprocable within the conduit, an end fitting extending axially from one end of the conduit with an externally threaded portion adapted to fit axially through an aperture in a mounting plate, the improvement comprising an overload safety fastener for yieldably securing the end fitting within the mounting plate aperture, said fastener having a pair of stops threadedly mounted for axial movement along the externally threaded portion of the end fitting, said stops being located on opposite sides of the mounting plate, said stops having radial flange faces, one of said stops being adapted for locating the end fitting relative to the mounting plate and taking up slack in the conduit, the other stop being positioned with its radial flange face spaced axially along the end fitting from the mounting plate, and resilient means extending axially of the end fitting between the radial flange face of said other stop and the mounting plate, said resilient means being compressed to a predetermined stress to resiliently urge said other stop away from the mounting plate, said resilient means being yieldable when the predetermined stress is overcome by an opposite force from the stop, said stops and resilient means being transposable on the end fitting to opposite sides of the mounting plate for accommodating overload stresses acting from either one side or the other side relative to the mounting plate.

2. An overload safety fastener as described in claim 1 wherein the axial spacing along the end fitting between the mounting plate and the radial flange face of the stop contacting the resilient means can be varied to adjust the amount of pre-loaded compressive stress in the resilient means.

3. An overload safety fastener as described in claim 2 wherein said axial spacing is varied by the resilient means contacting stop being threadedly turned for axial movement along the externally threaded portion of the end fitting.

4. An overload safety fastener as described in claim 1 wherein said other stop has a cylindrical portion extending axially about the externally threaded portion of the end fitting, said cylindrical portion fitting telescopically within the aperture of the mounting plate, said radial flange face projecting radially outward from an end of the cylindrical portion remote from the mounting plate, and said resilient means being positioned about the cylindrical portion between the radial flange face and the mounting plate.

* * * * *